(12) United States Patent
Wilke et al.

(10) Patent No.: US 7,546,219 B2
(45) Date of Patent: Jun. 9, 2009

(54) AUTOMATED DAMAGE ASSESSMENT, REPORT, AND DISPOSITION

(75) Inventors: Daniel D. Wilke, Mesa, AZ (US); Dennis K. McCarthy, Higley, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/217,660

(22) Filed: Aug. 31, 2005

(65) Prior Publication Data

US 2007/0061109 A1   Mar. 15, 2007

(51) Int. Cl.
G06F 11/30 (2006.01)
G06F 11/00 (2006.01)

(52) U.S. Cl. ............... 702/183; 702/182; 702/187; 702/188

(58) Field of Classification Search ........... 702/42, 702/183, 182, 184, 185, 186, 187, 188, 35, 702/36; 345/24, 632; 701/2, 3, 29; 705/7, 705/8, 9; 700/292, 293, 294; 324/500; 89/1.1, 89/1.11

See application file for complete search history.

(56) References Cited

U.S. PATENT DOCUMENTS 4,027,448 A * 6/1977 Tymciurak ............ 52/632
2002/0123915 A1 * 9/2002 Denning et al. ............ 705/7
2002/0188479 A1   12/2002 Renwick et al.
2002/0191002 A1 * 12/2002 Friedrich et al. .......... 345/632
2003/0158676 A1 * 8/2003 Fields et al. ............. 702/42
2003/0204332 A1   10/2003 Beney et al.
2004/0039465 A1   2/2004 Boyer et al.
2005/0171952 A1   8/2005 Gray

FOREIGN PATENT DOCUMENTS

WO  PCT/US2006/034215   4/2008

* cited by examiner

Primary Examiner—Eliseo Ramos Feliciano
Assistant Examiner—Phuong Huynh
(74) Attorney, Agent, or Firm—Haynes & Boone, LLP.

(57) ABSTRACT

Systems and techniques to assess damage. A damage reporting module may allow a user to provide information indicative of a damage description and damage location. The damage reporting module may create a data object based on the information. The data object may be used to compare the damage event to one or more historical damage events. The data object may be used in an analysis module to automatically determine disposition information (e.g., repair information).

16 Claims, 12 Drawing Sheets

AUTOMATED DAMAGE ASSESSMENT, REPORT, AND DISPOSITION

BACKGROUND

1. Field of Invention

The present disclosure relates generally to damage assessment and reporting in vehicles and other structures.

2. Background

For some structures, damage assessment may occur at a location that is removed from engineering resources (e.g., engineering personnel, test equipment, analytical tools, etc.). In order to determine the best course of action based on the damage, multiple back-and-forth communications between on-site personnel and off-site engineering resources may be needed.

One example of a situation in which damage assessment may be difficult is the assessment of damage to vehicles, such as military aircraft. A maintainer, located at the site of the damaged vehicle, may assess the damage and communicate the assessment to a remote engineering authority for analysis and disposition. The engineering authority may respond to the communication with a request for additional information. This process may be repeated a number of times before a final determination is made. As a result, there may be a significant delay in the vehicle's return to service.

There may be further delay as the disposition (e.g., repair strategy, procedures, structure usage restrictions, etc.) is approved and communicated to the maintainer. Additionally, the methods used to convey damage and disposition information (e.g., telephone, email, etc.) are vulnerable to human error. Errors may further increase the delay in returning the vehicle to service, and may increase the repair cost.

Additionally, damage information may not be retained in a meaningful way in existing damage assessment and reporting schemes. For example, communications between a maintainer and an engineering authority may consist of an email exchange, which may be printed out and put into the vehicle's file, or which may be maintained on a server. The damage and analysis information, both current and historical, may be difficult to obtain and interpret. As a result, similar damage events may not be efficiently assessed and analyzed, which may increase the average time a vehicle is unavailable for use.

In some industries, automated failure diagnosis may be accomplished in different ways. For example, in the automobile industry, on-board computers may be used to monitor operating parameters. In response to an out-of-bound operating parameter, an error code may be generated.

For example, an automobile may include an oxygen sensor to monitor the amount of oxygen in the exhaust, so that the air/fuel mixture may be adjusted to reduce emissions. An on-board computer may detect parameters indicative of the oxygen sensor performance. When the parameters indicate that the oxygen sensor should be replaced, an appropriate error code may be generated, and a "check engine" or other warning light may be turned on. A maintainer may read the error code, determine that a faulty oxygen sensor is indicated, and replace the oxygen sensor.

Although automated failure diagnosis may provide a number of benefits, it may not be optimal for some systems. For example, in systems where there may be a large number of damage scenarios that are not easily automatically characterized a priori, implementing automated failure diagnosis may be impractical.

SUMMARY

In general, in one aspect, a damage assessment system may comprise at least one of a damage reporting module, an automated analysis module, and a repair data module. A damage reporting module may comprise an article comprising a machine-readable medium embodying information indicative of instructions that when performed by one or more machines result in operations comprising presenting a first display representing a plurality of locations of a pre-selected structure type. The operations may further comprise receiving user input indicative of one of the plurality of locations, and presenting a second display representing a plurality of sub-locations included in the one of the plurality of locations.

The operations may further comprise receiving user input indicative of one of the plurality of sub-locations, and determining location information for a first damage event based on at least the user input indicative of one of the plurality of sub-locations. The operations may further comprise presenting another display including a plurality of damage definition selections and receiving user input indicative of one of the plurality of damage definition selections. The operations may further comprise determining damage description information for the first damage event based at least on the user input indicative of one of the plurality of damage definition selections, and creating a damage report data object associated with the first damage event, the data object including the damage location information and the damage description information.

The damage report data object may be transmitted to an analysis module. The analysis module may comprise information indicative of instructions that when performed by the one or more machines may result in operations comprising receiving the damage report data object, determining if the first damage event may be automatically analyzed, and if the first damage event may be automatically analyzed, performing one or more analysis techniques using the damage report data object.

The operations may further comprise creating a disposition data object based on an output of the analysis. The disposition data object may include at least one of repair information and time information. Repair information may include at least one of information indicative of repair instructions, one or more repair parts, a time to repair, and a time to operate without repair.

In general, in another aspect, an automated analysis module may comprise an article comprising a machine-readable medium embodying information indicative of instructions that when performed by one or more machines result in operations comprising receiving a damage reporting data object for a particular damage event, the data object including location information for a damaged part of a structure of a pre-selected type, the data object further including damage description information indicative of damage characteristics of the damaged part. The operations may further comprise performing finite element analysis of the damaged part using the data object and load information for the structure. The operations may further comprise determining corrective action for the particular damage event based on an output of the finite element analysis.

In general, in another aspect, a method may comprise receiving user input specifying a location of damage of a structure of a pre-determined structure type. The method may further comprise receiving user input specifying a description of the damage, and automatically creating a data object for the structure including location information indicative of the location and description information indicative of the description.

The method may further comprise automatically comparing the data object to a historical data object, where the historical data object comprises location information indicative of damage location of a different structure of the predetermined structure type, and description information indicative of a description of damage to the different structure. The historical data object may further comprise corrective action information indicative of one or more corrective actions for the damage to the different structure.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Systems and techniques provided herein may allow for more efficient damage identification, assessment, and reporting. The systems and techniques may be applied to a variety of structures, including helicopters, airplanes, watercraft, automobiles, spacecraft, and other vehicles. Additionally, the systems and techniques may be applied to structures that may be damaged at a location remote from engineering resources, such as bridges, dams, antenna towers, and other structures.

Although damage assessment of many types of structures may be performed, the following discusses damage assessment using the example of a vehicle such as an aircraft.

Figure 1:
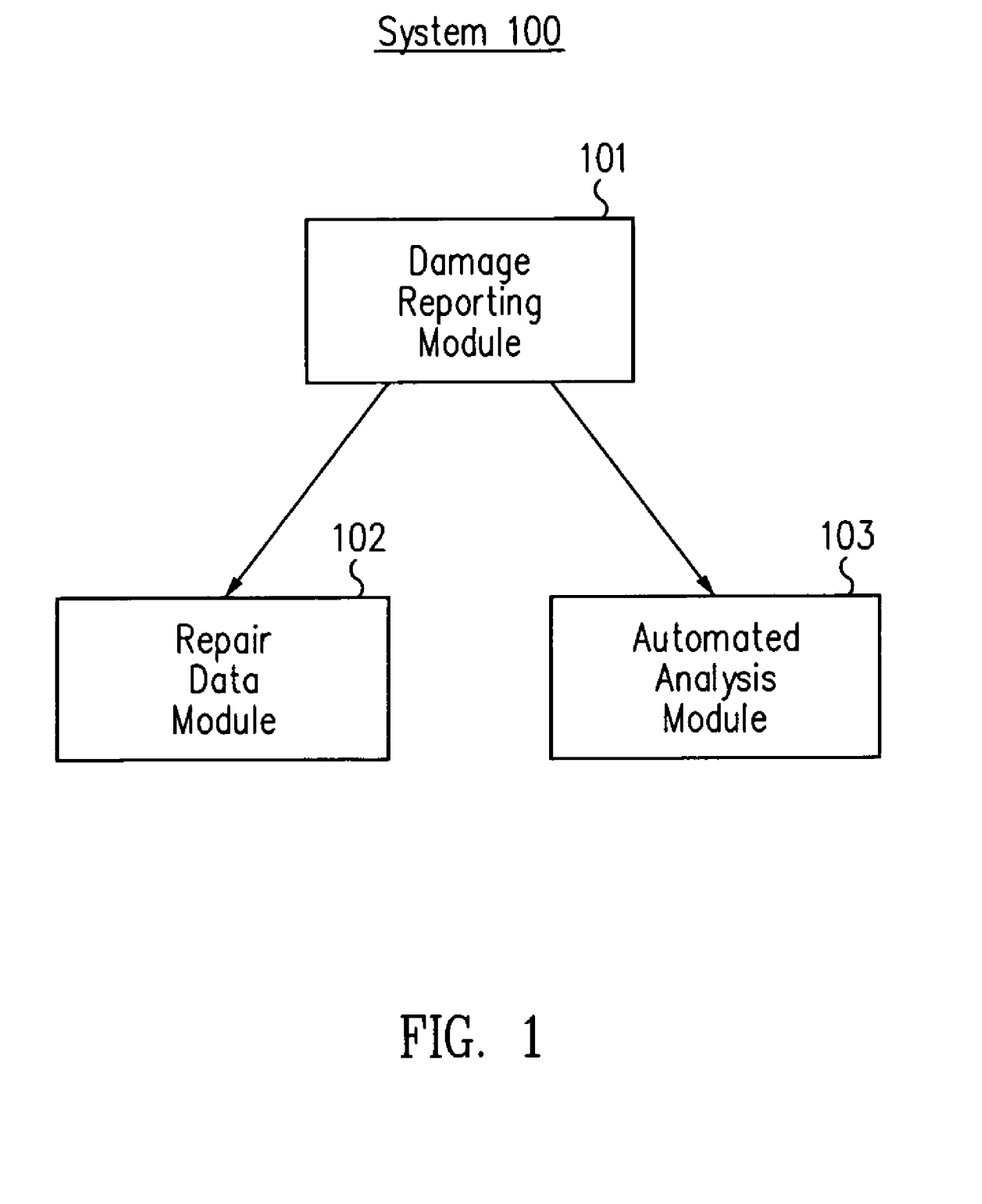
FIG. 1 is a diagram of a system for damage reporting and analysis, in some embodiments.

FIG. 1 shows a diagram of a system 100 for damage identification, assessment, and reporting. System 100 includes three modules: a damage reporting module 101, a repair data module 102, and an automated analysis module 103.

Figure 2:
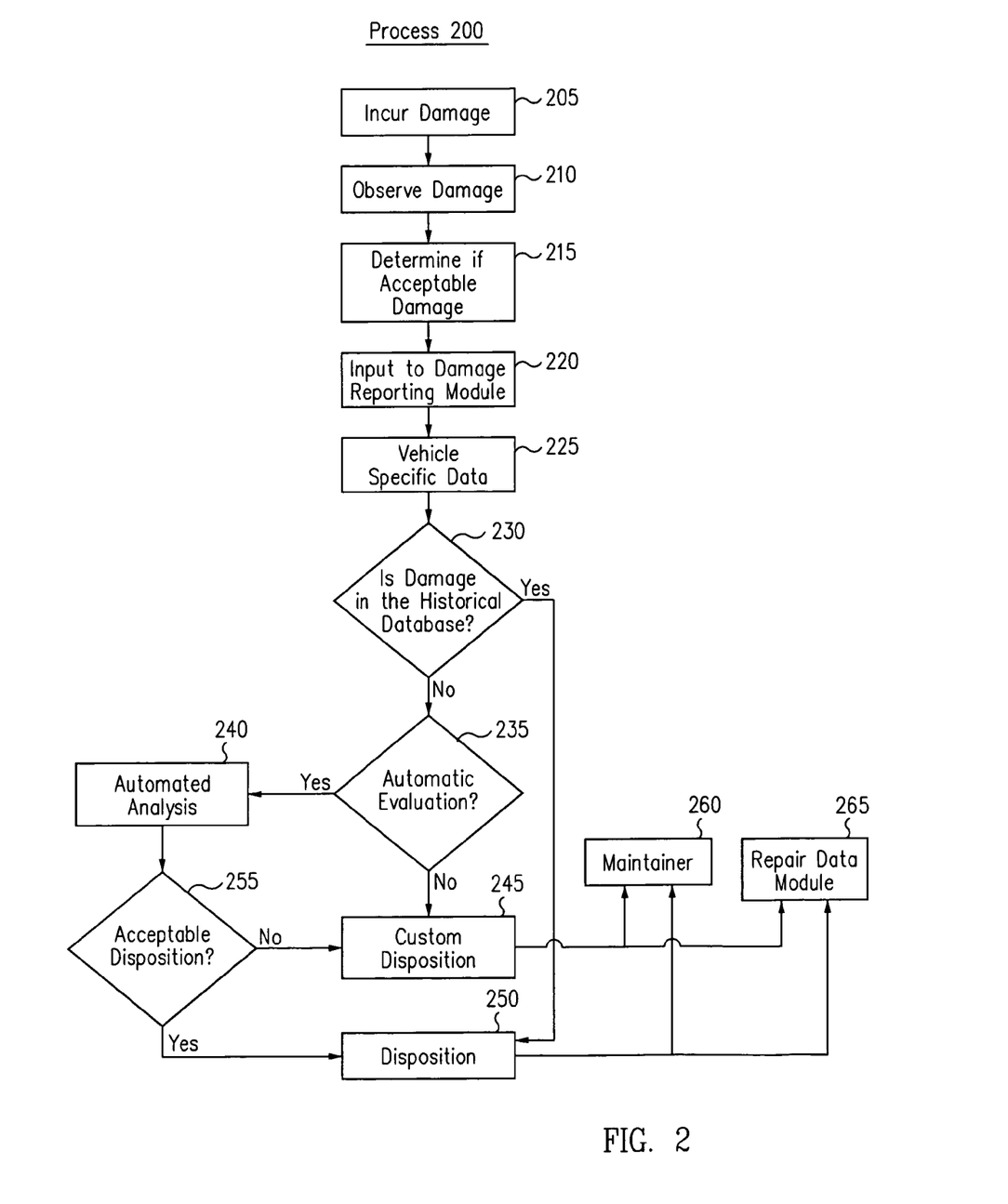
FIG. 2 is a process for damage reporting and analysis, in some embodiments.

FIG. 2 shows a process 200 that may be used for identifying and assessing damage, determining and communicating a disposition, and compiling damage information.

At 205, damage is incurred. The damage may be incurred at a location remote from a full engineering facility. At 210, a maintainer (e.g., field maintainer, operator, inspector or other maintainer) may observe the damage. Damage observation may include viewing the damage and noting the location and characterization of the damage. For example, the maintainer may note the location of the damage with respect to different parts of the vehicle, may photograph the damage, may measure and/or estimate one or more aspects of the damage (such as a crack length, crack location, bend angle, etc.), and the like.

At 215, in some circumstances, the maintainer may determine whether the damage falls within acceptable damage limits prior to characterizing the damage using damage reporting tool 101. For example, the maintainer may access a searchable database (such as a database included in repair data module 102) and determine whether the observed damage is within an acceptable range. If it is, no further action may be needed. However, in some circumstances, it may be beneficial to input "acceptable" damage into system 100 to allow for more complete damage tracking and analysis.

At 220, the maintainer creates a damage report data object associated with the first damage event using the damage reporting module 101. Damage reporting module 101 includes instructions for presenting a graphical user interface (GUI) to enable vehicle-specific damage reporting. The GUI allows the maintainer to provide input indicative of the damage location on the specific vehicle, as well as the character and size of the observed damage. Note that a damaged vehicle may have a number of damage events (e.g., more than one damaged part), and data objects for each damage event may be created and analyzed. However, in some cases, the data objects may be processed together in system 100, so that overall effect of the different damaged parts may be analyzed.

Data reporting module 101 may utilize standardized input techniques such as keyword techniques. Keywords embedded in damage reporting module 101 may allow data to be collected for repair data module 102 without the need for user creation/input of a database record.

A unique identifier may be assigned to the damage report data object, so that data associated with the first damage event may be easily identified. The identifier may also allow historical data for the specific vehicle to be identified.

At 225, vehicle-specific data may be provided. The vehicle-specific data may include data indicative of vehicle usage, load, requirements, materials, or other types of vehicle-specific data. Vehicle-specific data may be stored in a database in system 100 or elsewhere (e.g., as part of repair data module 102), may be input, or both.

At 230, the system determines whether the same or similar damage is stored in repair data module 102. For example, the system may use keywords embedded in damage reporting module 101 to search repair data module 102. If the first damage event is sufficiently similar to a previously analyzed damage event, the system may provide data indicative of a disposition (e.g., appropriate corrective action) for the previously analyzed damage event. For example, the system may generate an electronic communication to the maintainer describing the appropriate corrective action, may associate corrective action data with the first damage event data object, and may store the result in repair data module 102.

At 235, the system may determine whether the first damage event is acceptable for automated analysis and/or disposition. For example, data embedded in damage reporting module 101 may be used to precisely identify locations in the vehicle structure and provide operational instructions to automated analysis module 103. If the first damage event is suitable for automated analysis (e.g., is in a location for which automated analysis tools are available and applicable), automated analysis module 103 may be used to determine a disposition for the damage event at 240. If not, a custom disposition may be necessary at 245.

At 240, automated analysis of the first damage event may include performing static and fatigue analysis based on damage data included in the damage report data object. A set of available repairs may be available, where the available repairs depend on the damage geometry and the outcome of the analysis. Automated analysis module 103 may determine an acceptable repair and/or other course of action at 255. Other courses of action may include continued use of the un-repaired vehicle for a particular time period determined by fatigue analysis. Automated analysis module 103 may create a data object including disposition information for the first damage event at 250.

If an acceptable repair or other disposition is not determined at 255, a custom analysis may be performed at 245. A data object including custom disposition information for the first damage event may be created at 245.

The disposition data object may include data indicative of the appropriate corrective actions (e.g., repair information and/or replacement information), as well as related time information (e.g., time associated with completion of the actions, time to operate the vehicle before repairing). Repair information may include repair instructions, a list of parts, a list of tools, and the like. At 260, the disposition data object may be used to provide disposition information to the maintainer. At 265, the disposition data object may be used to provide disposition information to be stored in repair data module 102.

The following sections provide additional details about damage reporting module 101, repair data module 102, and automated analysis module 103, according to some embodiments.

Damage Reporting Module

Damage reporting module 101 of FIG. 1 may include a plurality of sub-modules, in some embodiments. For example, in some embodiments, damage reporting module 101 may include one or more of a damage location module, a damage definition module, a data reporting module, and a response module.

Figure 3A:
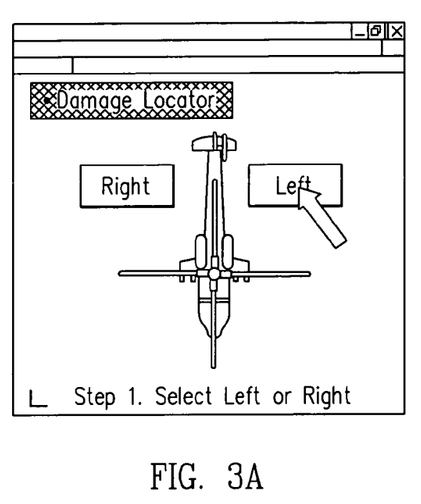
FIGS. 3A to 3C show exemplary displays that may be presented as part of a damage location module, in some embodiments.
Figure 3B:
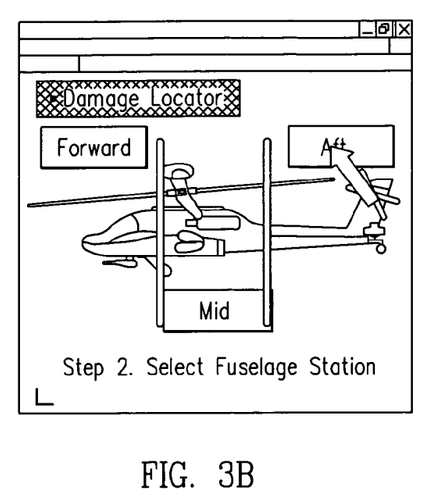
Figure 3C:
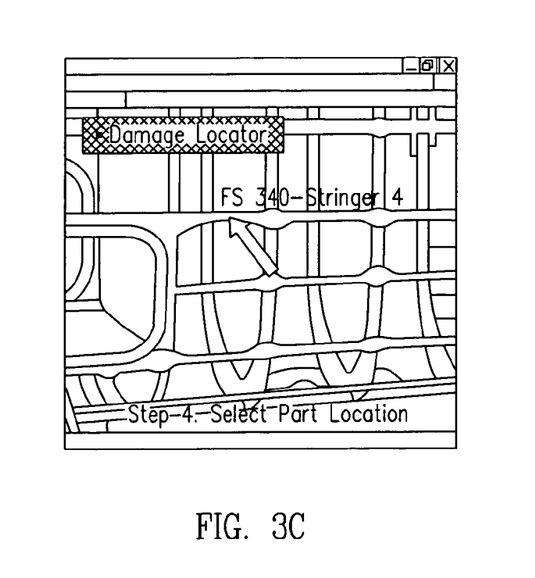

FIGS. 3A to 3C show exemplary displays that may be presented to a maintainer as part of a damage location module for a particular vehicle (a particular helicopter model). FIG. 3A shows a first level display, allowing a maintainer to select the right or left side of the helicopter. In response to a particular user selection (here, selecting the left side of the helicopter), a second level display of FIG. 3B is presented, allowing the maintainer to further specify the location of the damage to a particular fuselage station of the helicopter. In response to selecting the aft fuselage station, the display of FIG. 3C is presented, allowing the maintainer to select a part location. This process may continue until the damage location has been specified as precisely as needed (e.g., by indicating the particular damaged part(s)), the damage location may be stored in a data file (e.g., text file) associated with the damage event identifier, and may be integrated with the damage report data object created by damage reporting module 101.

Figure 4A:
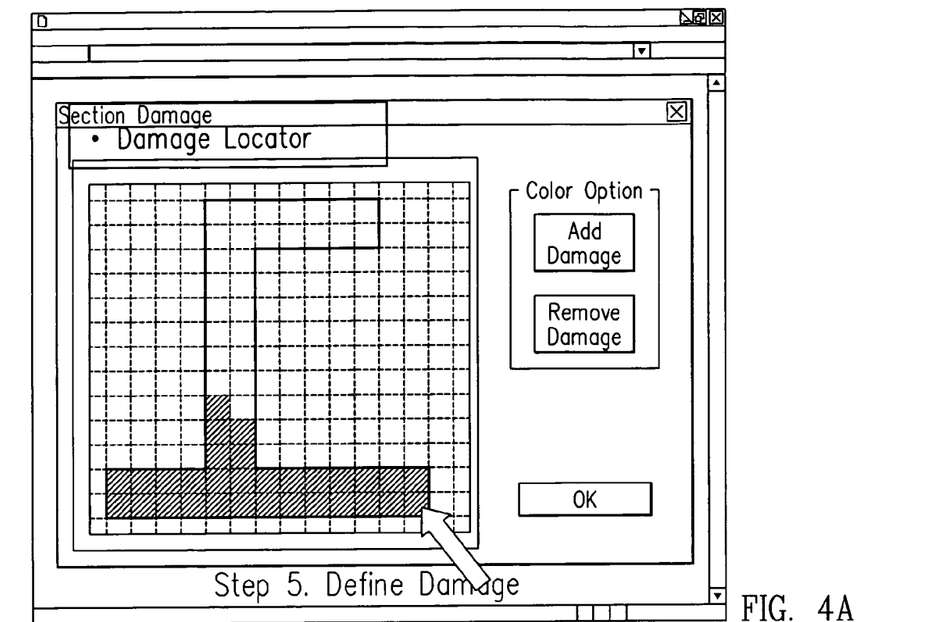
FIGS. 4A and 4B show exemplary displays that may be presented as part of a damage definition module, in some embodiments.

A damage definition module may also be included in damage reporting module 101. FIGS. 4A and 4B show exemplary displays that may be presented to a maintainer as part of a damage definition module for the helicopter of FIGS. 3A to 3C. When a damage location has been identified, a damage definition menu such as that shown in FIG. 4A may be presented. The damage definition menu may allow the maintainer to locate the actual damage on a cross section of the part. The damage definition menu may be part-specific; allowing the maintainer to define the damage appropriately for different parts of the helicopter (or other structure).

Figure 4B:
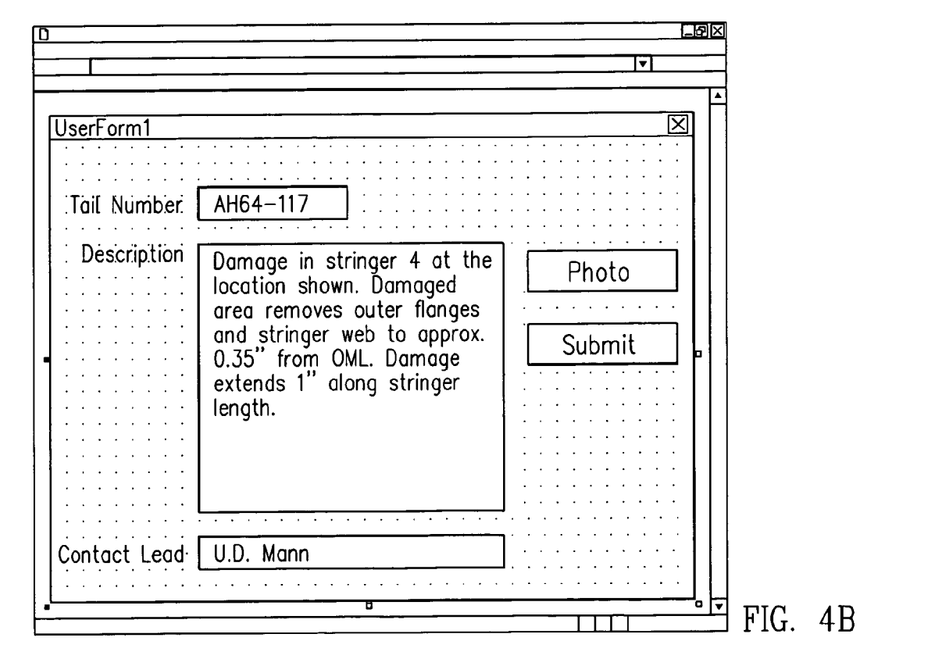

The damage definition module may present a display allowing the maintainer to provide a description of the damage. FIG. 4B shows an exemplary display, allowing entry of a text description, contact personnel identification information, and an attachment icon allowing the maintainer to associate one or more photographs of the damage with the damage information.

Figure 5:
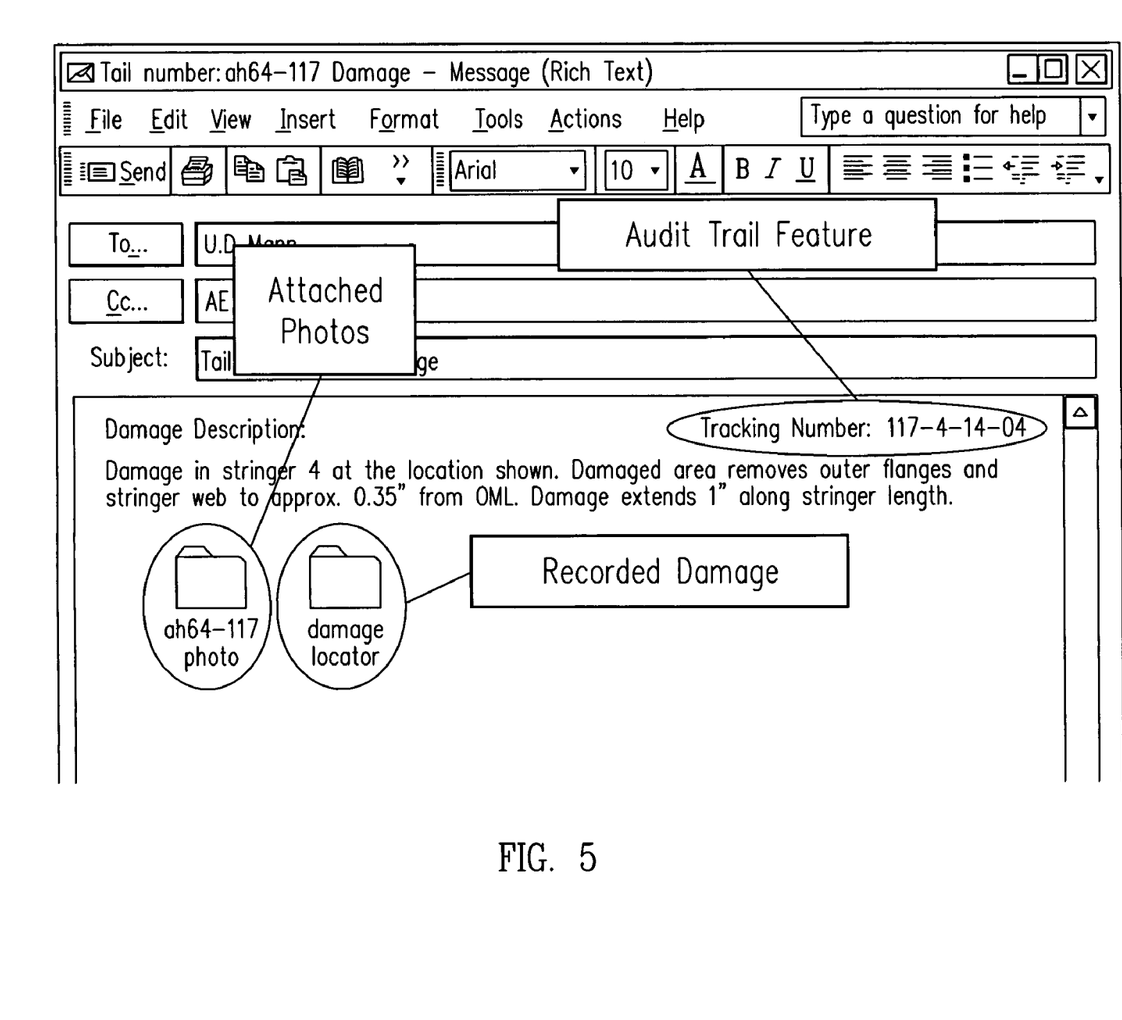
FIG. 5 shows a communication that may be generated in a reporting module, in some embodiments.

Damage reporting module 101 may further include a data reporting module. The data reporting module may communicate information in the damage report data object to one or more destinations. For example, the data reporting module may automatically generate an email addressed to one or more predefined locations, as illustrated in FIG. 5. The email may communicate information such as a serialized tracking number, damage description information, one or more damage photos, and damage definition information. For example, a text description of the damage may be included in the body text of the email, detailing the location, size, and type of damage of the part. An attached photo folder may be used as a storage location for any photographs believed to be useful in the definition/disposition of the damage. The report may include many different types of information in addition to/instead of the above types, such as references to links to historical data.

Of course, many other methods may be used to communicate information in the damage report data object, such as direct upload of damage information to a web site and other methods. Further, the damage report data object may include information that is transparent to the user, but may be transmitted along with user-readable information.

The serialized tracking number may be assigned to the damage report, and may be indicative of a vehicle identifier (e.g., the tail number of the damaged helicopter). The tracking number may be associated with the damage report data object. The tracking number may allow tracking of the damage assessment process; for example, using a "time and location" log that may be accessed by authorized persons. The tracking number may also allow collection, sorting, and displaying damage data and statistics for individual aircraft, for units and for the fleet.

Figure 6:
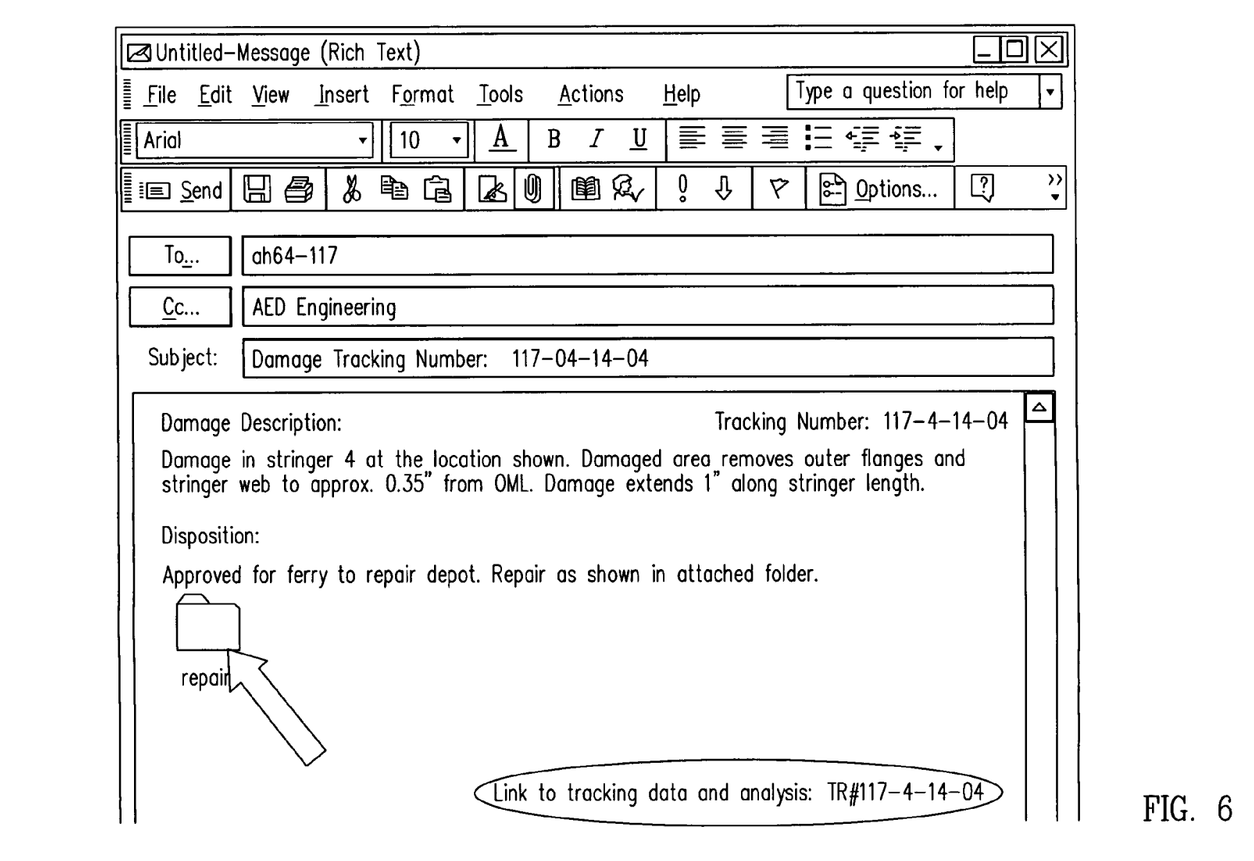
FIG. 6 shows a communication that may be generated in a response module, in some embodiments.

Damage reporting module 101 may also include a response module. The response module may allow an engineering authority to transmit damage disposition information (e.g., repair information, time-to-repair information, etc.) directly to the maintainer. FIG. 6 shows an exemplary response email, which may include a reference to the tracking number and reported damage, and may include a link to allow authorized access to tracking data and analysis. The response module may communicate a disposition for each reported damage location, as well as repair information.

Repair Data Module

Repair data module 102 may be implemented as a historical damage database. The database structure may be easily searchable using keyword search techniques. The keywords may be vehicle-specific, applying to the specific type of aircraft, damage location, etc., to more easily retrieve data for analysis, disposition, aircraft readiness information, and the like. Typical and/or standard repair methods that may be used in certain instances may also be included in the repair data module.

Automated Analysis Module

The automated analysis module may perform rapid analysis of specific structural damage. For an aircraft, the damage may be caused by battle, tool drop, corrosion, or other damage source.

Figure 7A:
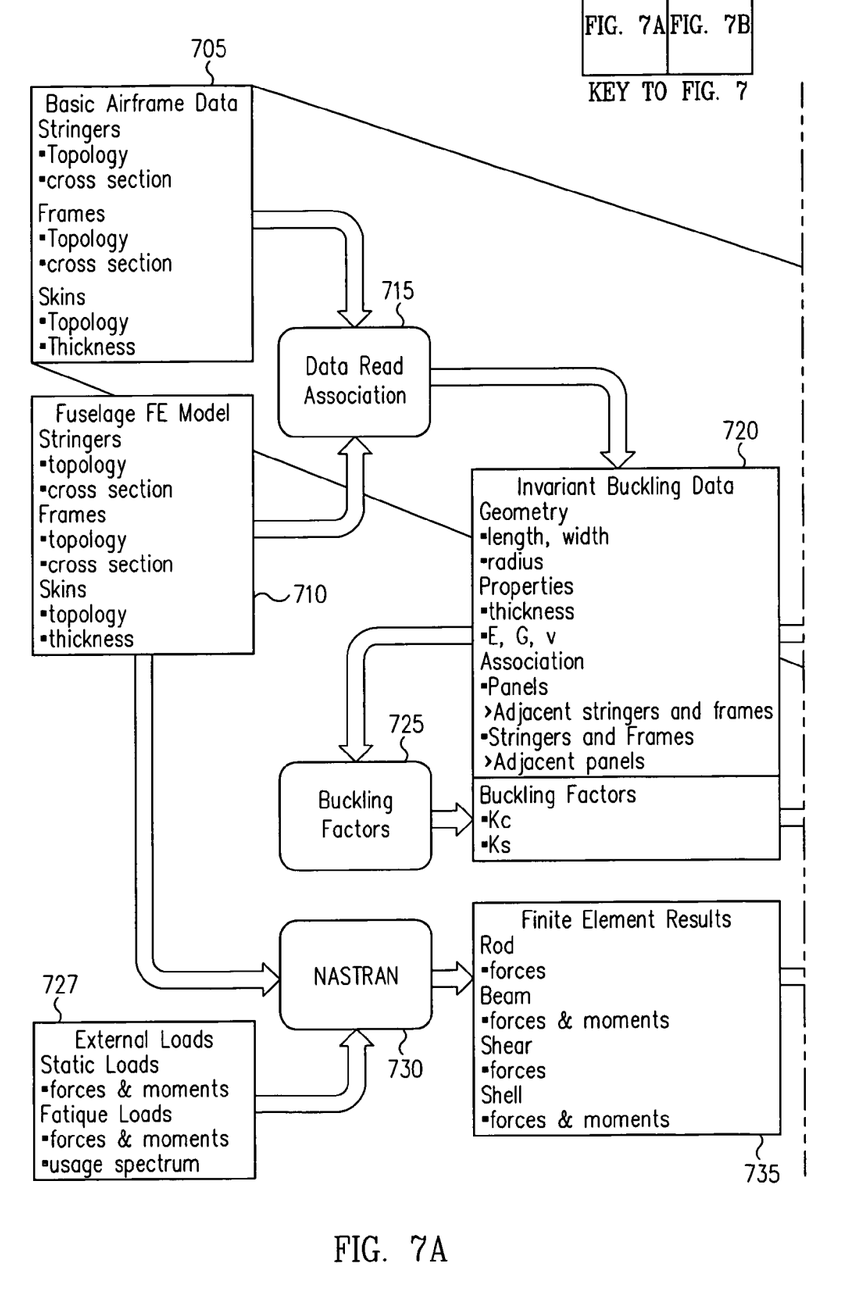
FIG. 7 is a process for minor damage analysis, in some embodiments.
Figure 7B:
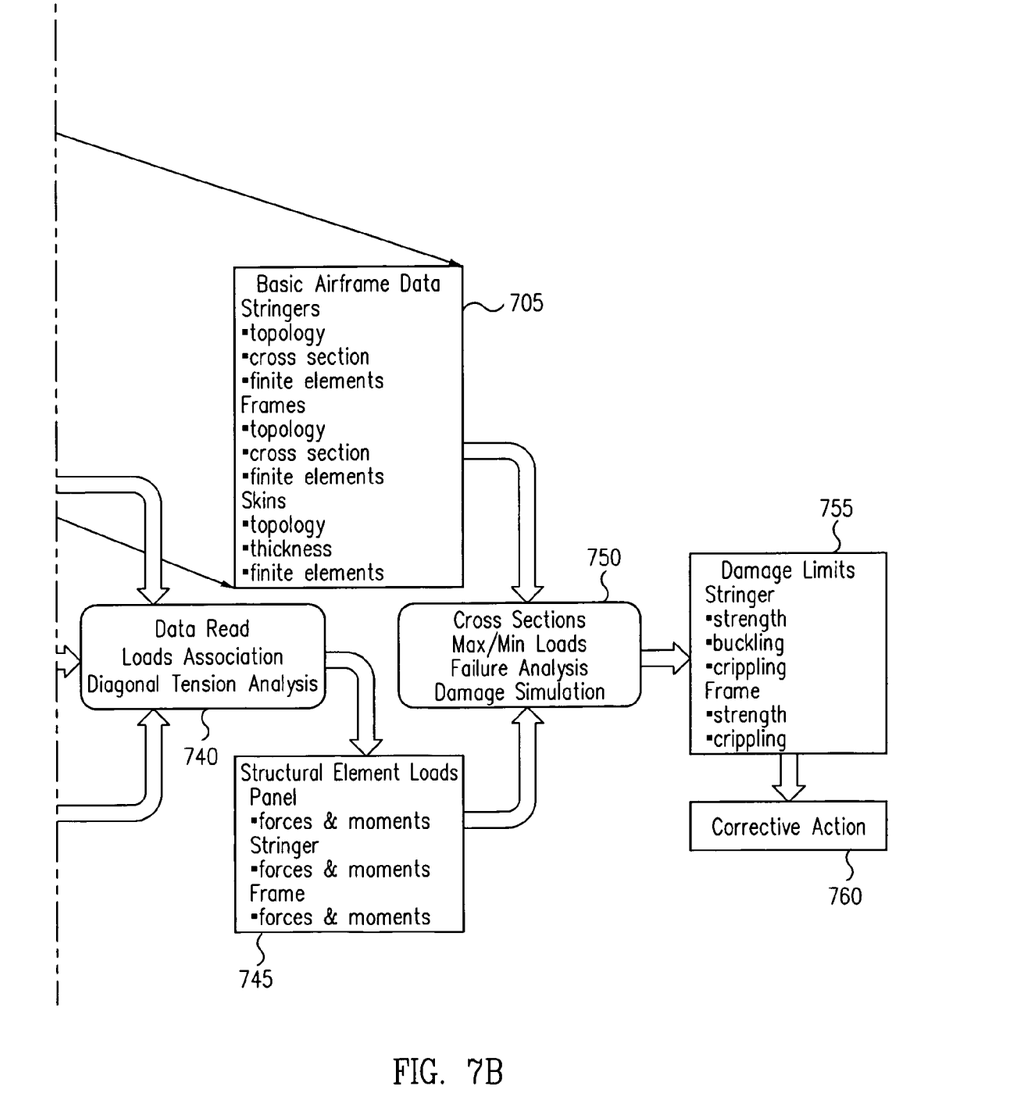

In some embodiments, separate analysis methodology may be used for different damage levels. For example, a first method may be used for minor damage, while a second method may be used for major damage. FIG. 7 shows a method 700 that may be used to analyze damage information corresponding to a minor damage event, according to some embodiments.

A finite element model for the fuselage may be provided at 710. At 705, basic airframe data may be provided that defines dimensional and material data for structural elements throughout the airframe. The association between the finite element model and the basic airframe data may be accomplished at 715. The output may be provided to a buckling model at 720, along with buckling factors at 725.

At 727, external load information may be provided. The fuselage finite element model and external load information may be input into a NASTRAN (NASA Stress Analysis) or other finite element solver at 730. The finite element model may use the external load information and cross-sectional properties and geometry of structural parts to produce finite element results at 735.

The buckling model output and finite element results, along with damage data, may be used for diagonal tension analysis at 740. Structural element loads that may include post buckling effects may be finally determined at 745, and may be used with provided basic airframe data to perform classical cross-section analysis, determine minimum and maximum loads, simulate damage, and perform failure analysis at 750. At 755, damage limits may be determined, and may be used to identify corrective action at 760.

Figure 8A:
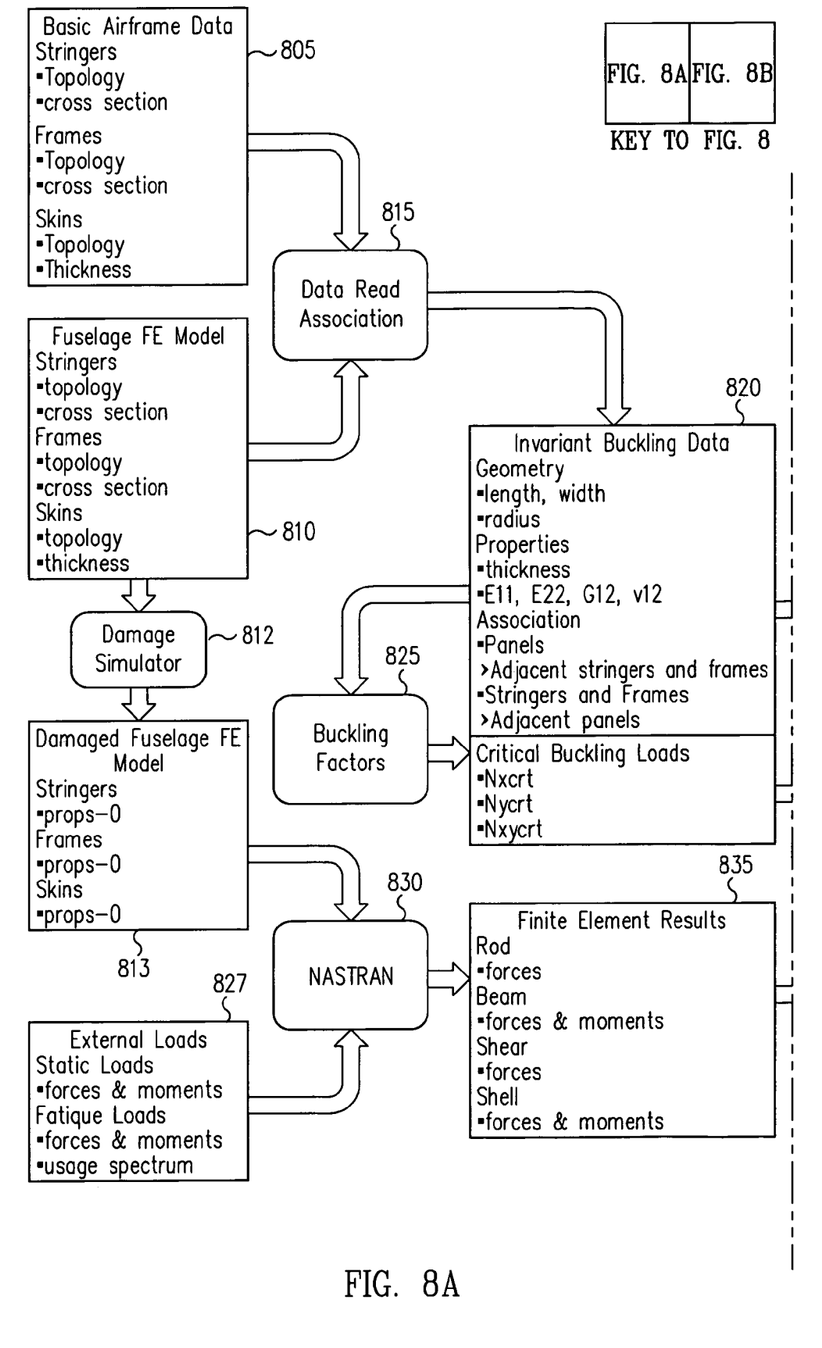
FIG. 8 is a process for major damage analysis, in some embodiments.
Figure 8B:
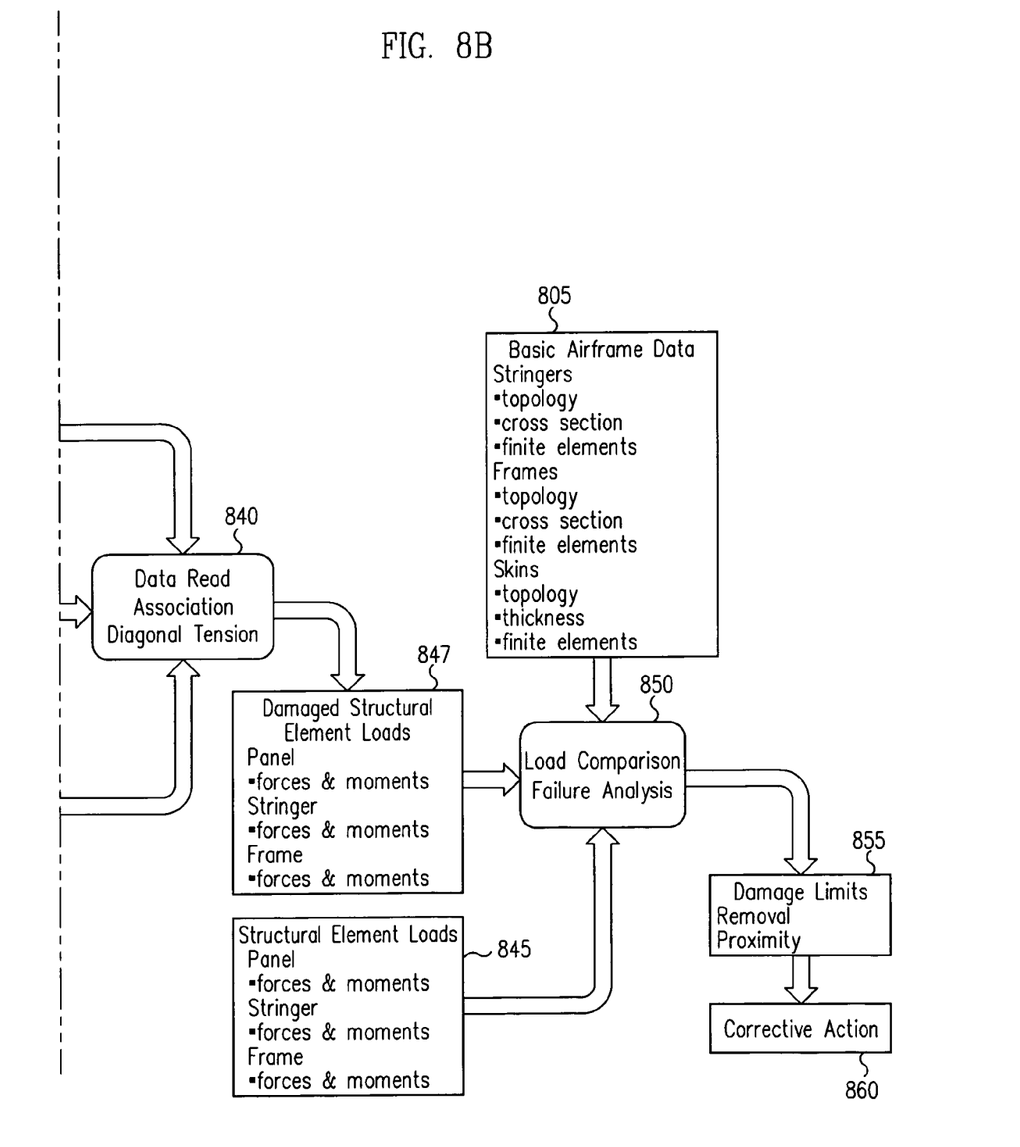

The analysis of major damage to a cross-section may be similar, but may include simulating the damage in a finite element model, capturing the load redistribution around the damage, performing analysis of the remaining structure adjacent to the damage location, and providing documentation of the analysis. FIG. 8 shows a flow chart of a method that may be used to analyze major damage. At 810, a fuselage finite element model may be provided. The finite element model along with the damage data may be input to a damage simulator at 812. The output of the damage simulator may be input to a damaged fuselage finite element model at 813. At 805, basic airframe data may be provided that defines dimensional and material data for structural elements throughout the airframe. The association between the finite element model and the basic airframe data may be accomplished at 815. The output may be provided to a buckling model at 820, along with buckling factors at 825.

At 827, external load information may be provided. The damaged fuselage finite element model and external load information may be input into a NASTRAN or other finite element solver at 830. The finite element model may use the external load information, cross-sectional properties and geometry of the structural parts to produce finite element results at 835. The buckling model output and finite element results, along with the damage data, may be used for diagonal tension analysis at 840.

Structural element loads for the damaged structural system that may include post buckling effects may be finally determined at 847. A parallel development of structural element loads for the pristine airframe may be made available at 845. A comparison of loads from 845 and 847 may be used at 850 to limit the number of locations requiring analysis. The loads from 847 may be used with provided basic airframe data to perform classical cross-section analysis, determine maximum and minimum loads, simulate damage, and perform failure analysis at 850. At 855, damage limits may be determined, and used to identify corrective action at 860.

Figure 9:
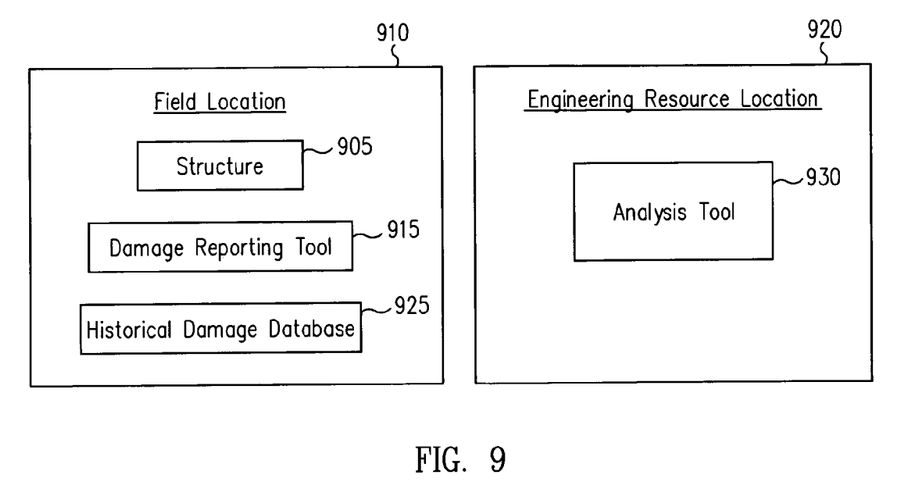
FIG. 9 illustrates the relative positioning of a damaged structure and engineering resources, in some embodiments.

The systems and techniques described above may be used to assess damage occurring at a location remote from engineering facilities; for example, to assess damage incurred in combat locations. FIG. 9 shows a schematic diagram of the relative positioning of a damaged structure such as a vehicle 905 at a field location 910 and engineering resources location 920 separate from field location 910.

A damage reporting tool 915 may be accessible at field location 910. Tool 915 may comprise, for example, instructions stored on a local data processor and/or a remote data processor.

In operation, a maintainer may use a graphical, interactive damage identification program included in damage reporting tool 915 to input information indicative of observed damage to a structure.

Damage information may be analyzed using an analysis tool 930. Analysis tool 930 may access information stored in a historical damage database 925, if available. Analysis tool 930 may implement techniques such as finite element analysis (FEA), classical analysis, and another analysis techniques. Analysis tool 930 may be implemented using a program such as a JAVA program.

Figure 10:
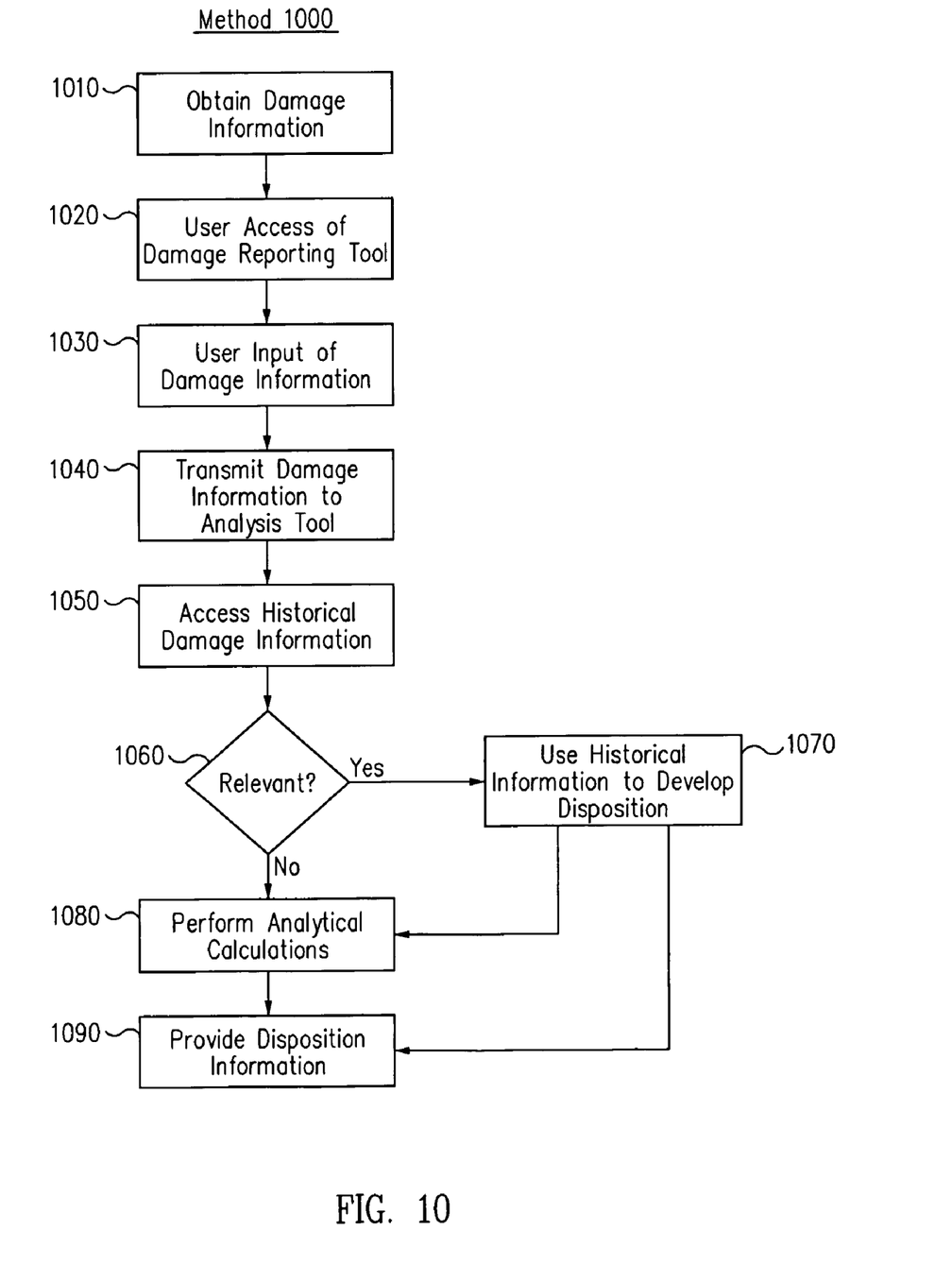
FIG. 10 is a process for damage reporting and analysis, in some embodiments.

FIG. 10 shows a method 1000 that may be used for a configuration such as that illustrated in FIG. 9, according to some embodiments. At 1010, damage information is obtained by observation of the damaged structure. For example, the damage may be observed by a person, and its location and description noted. The damage may be photographed. Measurements may be taken; for example, measurements of bend angles, crack lengths, etc.

At 1020, once damage information has been obtained, a user may access damage reporting tool 915 via a graphical user interface of a device at field location 910. Note that reporting tool 915 need not be stored at field location 1010; the user may access instruction stored on a remote device (such as a server) from the device at field location 910. In some implementations, instructions for both reporting tool 915 and analysis tool 930 may be stored on a device at field location 910, so that reporting and analysis may be performed without the need for accessing remote devices.

At 1030, the user may input damage information. For example, the user may input information indicative of a location of the damage (e.g., a part number of a damaged constituent), and may input information indicative of the damage itself (e.g., a description of the damage, a photo of the damage, measurements of the damage, etc.)

At 1040, the damage information is transmitted to analysis tool 930. Analysis tool 930 may include instructions and data stored on one or more devices at engineering resources location 920, may be a separate module stored in a device at field location 910, or may be implemented in another way.

At 1050, analysis tool 930 may access historical damage information stored in a data structure such as historical damage database 925 (which may be stored at least partially at field location 910, at engineering resources location 920, or other). For example, analysis tool 930 may access one or more candidate repair records for the same or similar parts (e.g., based on a part number or related part number). If candidate repair records are available, analysis tool 930 may compare the damage information to historical information associated with one or more repair records to determine if the information is relevant to the current damage, at 1060. If so, analysis tool 930 may use the relevant historical information to develop a disposition at 1070.

At 1080, analysis tool 930 may perform one or more analytical calculations (e.g., finite element analysis calculations) to develop a disposition, in addition to or instead of using relevant historical information. At 1090, analysis tool 930 may provide disposition information based on at least one of relevant historical information and an output of one or more analytical calculations. The disposition information may be provided to a maintainer at field location 910, and may be provided to historical damage database 925.

In implementations, the above described techniques and their variations may be implemented as computer software instructions. Such instructions may be stored on one or more machine-readable storage media or devices and are executed by, e.g., one or more computer processors, or cause the machine, to perform the described functions and operations.

A number of implementations have been described. Nevertheless, it will be understood that various modifications may be made without departing from the spirit and scope of the invention. For example, additional, fewer, and/or different elements may be used to implement the invention. The order of elements in the apparatus and/or the order of acts performed may be different than that described above. Further, although damage observation and the like are described as being performed by a "maintainer," different acts may be performed by different types of persons, and/or may be performed at least partially automatically. Acts being described as performed by a "maintainer" need not be performed by the same person/entity. For example, robotic observation and data gathering systems and techniques may be used for some operations described as being performed by a "maintainer." Accordingly, other implementations are within the scope of the following claims.

Also, only those claims which use the words "means for" are intended to be interpreted under 35 USC 112, sixth paragraph. Moreover, no limitations from the specification are intended to be read into any claims, unless those limitations are expressly included in the claims.

What is claimed is:

1. An article comprising a machine-readable medium embodying information indicative of instructions that when performed by one or more machines result in operations comprising:

presenting a first display enabling a selection from a plurality of views of a vehicle;

responsive to a user selection of one of the views, presenting a second display representing a plurality of vehicle portions within the selected view;

responsive to a user selection of one of the portions, determining a part identity for a first damage event;

presenting another display including a plurality of damage definition selections;

responsive to user selection of one of the damage definitions, determining damage description information for the first damage event;

automatically creating a damage report data object associated with the first damage event, the data object including the part identity and the damage description information; and automatically comparing the damage report data object of the first damage event to a historical data object of a previously analyzed damage event, the historical data object comprising location information indicative of a damage location of the previously analyzed damage event, description information indicative of a description of damage of the previously analyzed damage event, and corrective action information indicative of one or more corrective actions for the damage of the previously analyzed damage event.

2. The article of claim 1, wherein the vehicle is an aircraft.

3. The article of claim 1, further comprising:
   retrieving the historical data object of the previously analyzed damage event from a storage medium.

4. The article of claim 1, further comprising:
   determining one or more corrective actions for the first damage event; and communicating the one or more corrective actions to a user.

5. The article of claim 1, wherein the operations further comprise:
   transmitting the damage report data object to an analysis module.

6. The article of claim 5, wherein the analysis module comprises information indicative of instructions that when performed by the one or more machines result in operations comprising:
   receiving the damage report data object;
   determining if the first damage event may be automatically analyzed; and
   if the first damage event may be automatically analyzed, performing one or more analysis techniques using the damage report data object.

7. The article of claim 6, wherein the one or more analysis techniques comprise finite element analysis.

8. The article of claim 6, wherein the one or more analysis techniques comprise finite element solver analysis techniques.

9. The article of claim 6, wherein the one or more analysis techniques comprise buckling analysis techniques.

10. The article of claim 6, wherein the operations further comprise:
    generating an analysis output based on at least one of the one or more analysis techniques.

11. The article of claim 6, wherein the operations further comprise:
    creating a disposition data object based on the analysis output.

12. The article of claim 11, wherein the disposition data object comprises at least one of repair information and time information.

13. The article of claim 12, wherein the repair information comprises at least one of information indicative of repair instructions, information indicative of one or more repair parts, information indicative of a time to repair, and information indicative of a time to operate without repair.

14. A method comprising:
    receiving user input specifying a location of damage of a structure of a pre-determined structure type;
    receiving user input specifying a description of the damage;
    automatically creating a data object for the structure including location information indicative of a location of the damage and description information indicative of the description;
    automatically comparing the data object to a historical data object, the historical data object comprising location information indicative of a damage location of a different structure of the predetermined structure type, the historical data object further comprising description information indicative of a description of damage to the different structure, the historical data object further comprising corrective action information indicative of one or more corrective actions for the damage to the different structure; and communicating the one or more corrective actions to a user.

15. The method of claim 14, further comprising associating the corrective action information for the different structure with the data object of the structure.

16. The method of claim 14, wherein the historical data object is stored in a historical database, and further comprising storing the data object of the structure in the historical database.

* * * * *